United States Patent [19]

Racicot

[11] 3,768,337

[45] Oct. 30, 1973

[54] AUTOMATIC TRANSMISSION AND CENTRIFUGAL CLUTCH ASSEMBLIES

[76] Inventor: Donatien Racicot, 618 Main St., St. Paul D'Abbotsford, Quebec, Canada

[22] Filed: May 22, 1972

[21] Appl. No.: 255,583

[52] U.S. Cl. .................................. 74/752 E, 74/765
[51] Int. Cl. ........................ F16h 3/74, F16h 57/10
[58] Field of Search .......................... 74/752 E, 765

[56] References Cited
UNITED STATES PATENTS
1,459,125  6/1923  Wheeler ............................ 74/752 E
2,132,728  10/1938  Ford et al. ......................... 74/752 E
2,597,854  5/1952  Gross et al. ....................... 74/752 E

*Primary Examiner*—Arthur T. McKeon
*Attorney*—Pierre Lesperance

[57] ABSTRACT

A simple automatic transmission adapted to be used on snowmobiles and other vehicles and to provide low and high speed forward drive, reverse drive and neutral and a centrifugal clutch having radially wedging members and friction discs adapted to be axially displaced by the wedging members in response to centrifugal action on the latter. An automatic transmission including a simple planetary gear assembly having a sun gear driven by the input shaft, a planet carrier rotatably controlled by a centrifugal clutch selectively restrained by a first brake and a ring gear associated to a second brake to be selectively held against rotation to produce forward drive and to be freed to produce reverse drive; a sliding gear unit adapted to transmit the drives to an output shaft and to produce a neutral and a simple shifting control to selectively actuate the sliding gear unit and the brakes.

9 Claims, 12 Drawing Figures

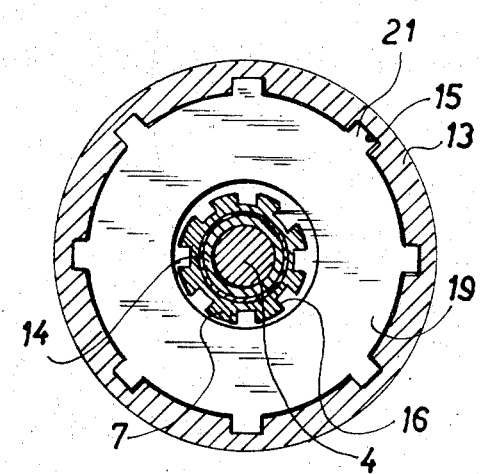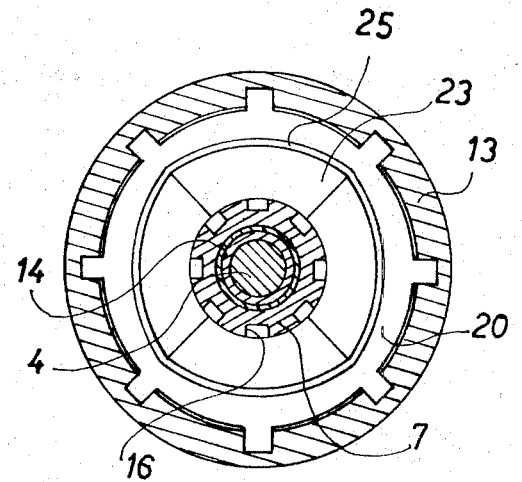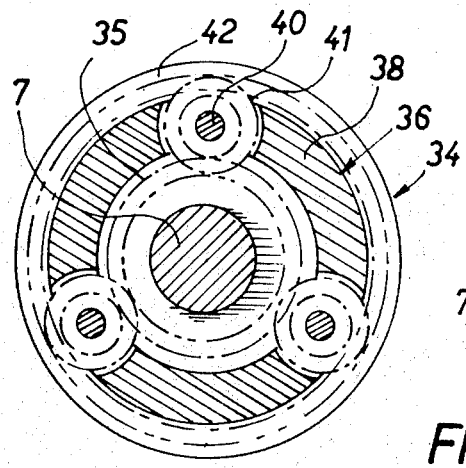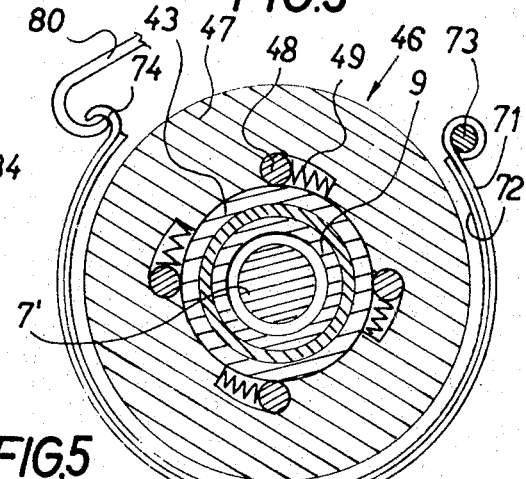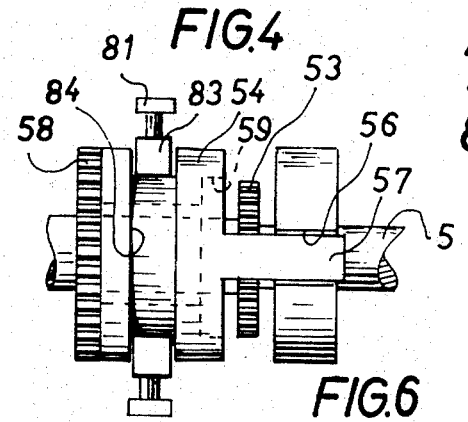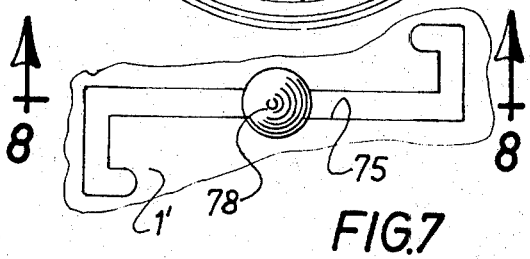

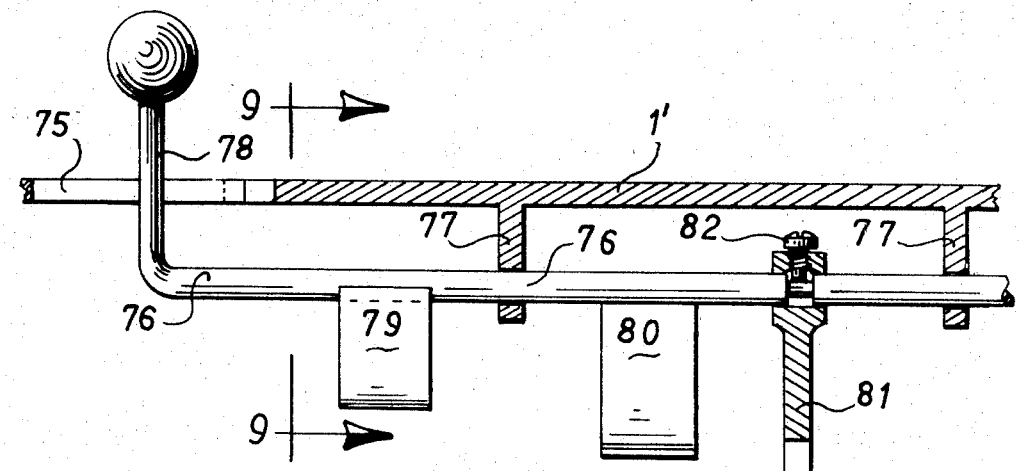
FIG.8
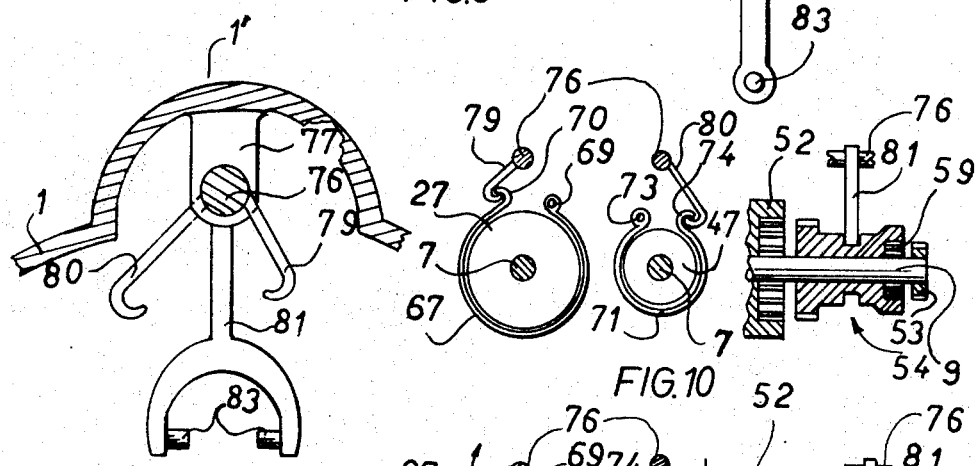
FIG.9  FIG.10
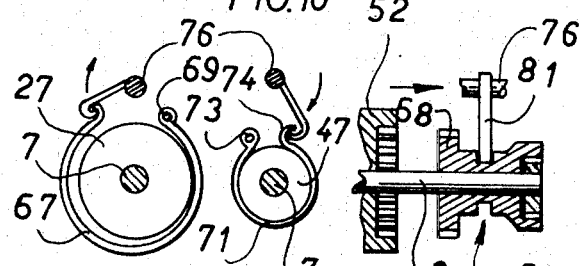
FIG.11
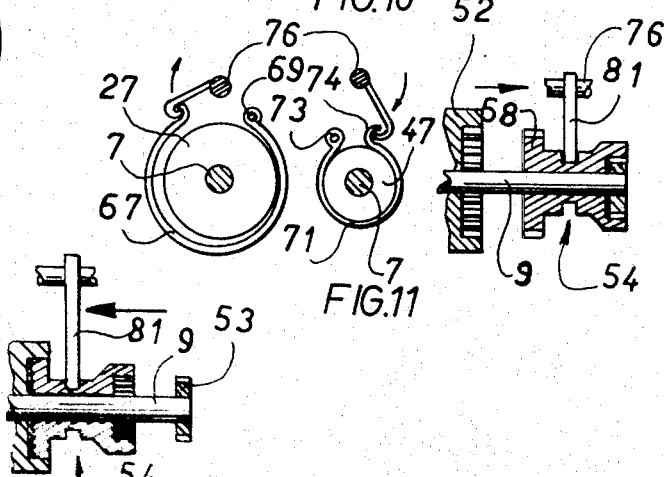
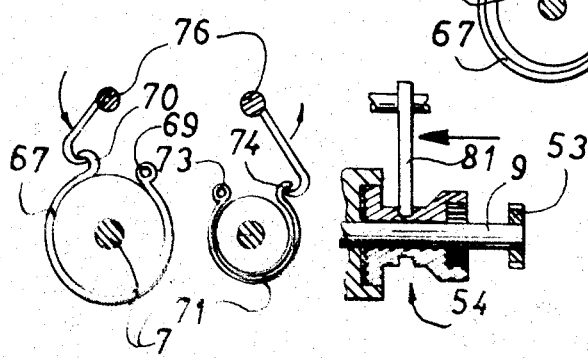
FIG.12

AUTOMATIC TRANSMISSION AND CENTRIFUGAL CLUTCH ASSEMBLIES

This invention relates to an automatic transmission and to an improved centrifugal clutch assembly particularly but not exclusively adapted to be used on snowmobiles.

The snowmobiles are now commonly using a variable diameter pulley to obtain the variable speed ratios. This is obtained by the action of excentrically pivoted weights against one axially displaceable flange of a pulley. Such system has proved satisfactory particularly due to its simplicity and low cost, but of somewhat erratic performance. Besides, a separate gear assembly has to be provided to produce reverse drive.

The present invention proposes a simple automatic transmission which is adapted for use on snowmobiles, all terrain vehicles and others and a centrifugal clutch assembly adapted for use into the automatic transmission to produce a more consistent and smoother performance than the current pivoted centrifugal weights and for use into a single integrated assembly producing low and high forward drive, reverse drive and neutral.

It is a general object of the invention to provide an improved and simplified centrifugal clutch assembly adapted for use in an automatic transmission for snowmobiles.

It is a more specific object of the invention to provide a centrifugal clutch assembly wherein the clutching is obtained by radially wedging members acting on axially displaceable friction discs.

It is another general object of the invention to provide an automatic transmission which is automatically clutch controlled to produce low and high speed forward drive.

It is a further object of the invention to provide an automatic transmission including simple planetary gear assembly, shifting control and brakes to obtain low and high speed forward drive, reverse drive and neutral.

The invention will now be described in detail with reference to a preferred embodiment thereof which is illustrated, by way of example only, in the accompanying drawings, in which:

FIG. 1 is a longitudinal sectional view of an automatic transmission according to the present invention;

FIGS. 2 and 3 are cross-sectional views as seen along lines 2—2 and 3—3 respectively in FIG. 1 and showing the internal structure of a centrifugal clutch according to the invention;

FIG. 4 is a cross sectional view as seen along line 4—4 in FIG. 1 particularly illustrating a planetary gear assembly forming part of the invention;

FIG. 5 is a cross-sectional view as seen along line 5—5 in FIG. 1 and illustrating a one-way clutch;

FIG. 6 is a general side view of a sliding gear assembly forming part of the automatic transmission illustrated in FIG. 1;

FIG. 7 is a partial exterior view of the casing of the automatic transmission illustrating a lever and slot control;

FIG. 8 is a cross-sectional view as seen along line 8—8 in FIG. 7;

FIG. 9 is a transverse cross-sectional view of the control lever, as seen along line 9—9 in FIG. 8;

Figure 1:
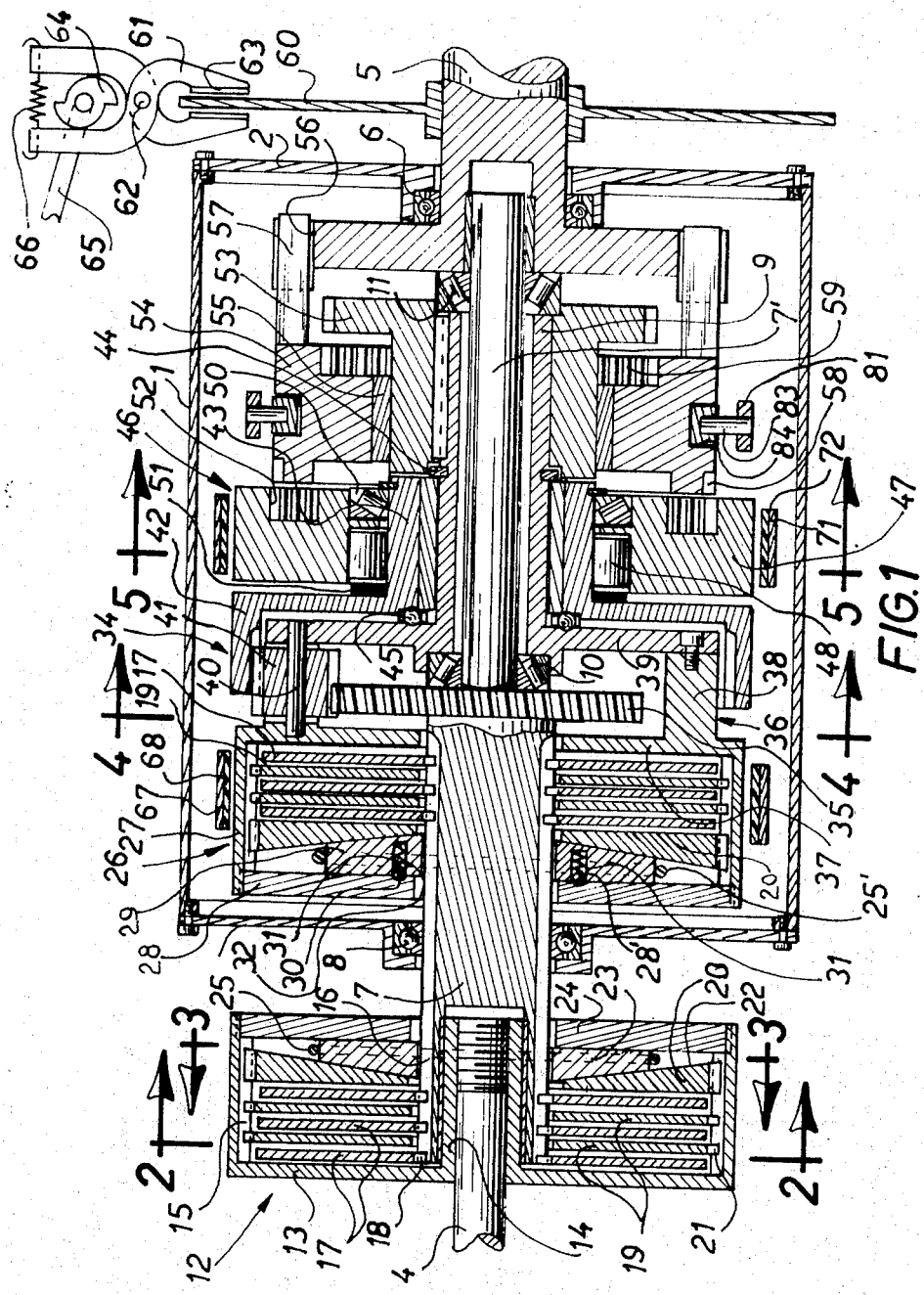

FIGS. 10, 11, and 12 are exploded views illustrating the action of the control lever on the automatic transmission for neutral, forward and reverse states respectively.

The illustrated automatic transmission includes a cylindrical casing 1 having removable covers 2 and 3. An input shaft 4, for instance the shaft of internal combustion engine, is aligned with an output shaft section 5 which is journalled in cover 2 by a bearing 6. A first intermediate shaft section 7 is journalled in cover 3 by a bearing 8 and has an integral extension 7' journalled in a recess of output shaft 5. A second intermediate shaft 9 is tubular and surrounds shaft extension 7' and is supported by bearings 10 and 11.

A centrifugal clutch 12 is operatively associated to the input shaft section 4 and the first intermediate shaft section 7 to drive the latter after the input shaft section has reached a predetermined speed of rotation. The centrifugal clutch assembly 12 includes a generally cupshaped rotor portion 13 with an axial sleeve 14 which is secured to the input shaft section 4, by screwing, keying or the like, to rotate with the latter. Intermediate shaft section 7 has an end bore to rotatably receive sleeve 14 and shaft 4. Rotor 12 has an annular portion provided with interior splines 15. Intermediate shaft portion 7 has exterior splines 16. Friction discs 17 have a central aperture formed with radially inwardly extending projections 18 engaging the splines 16 to rotate with the intermediate shaft portion 7. Annular interfacing discs 19 and 20 are engaged between and adjacent the friction discs 17. Each of the interfacing discs 19 and 20 is provided with radially outwardly extending projections 21 engaging the splines 15 of the rotor portion 12. The friction discs 16 are preferably provided with annular facings of friction material, as is well known in the art of clutches, to provide frictional engagement between the same and the adjoining surfaces. It must be noted that all the discs 17, 19, and 20 are axially slidable relative to the rotor portion 12 and shaft 7 and that the discs 17 rotate with shaft 7, while the discs 19 and 20 rotate with the rotor portion 12.

The disc 20 is of annular shape having a radially inwardly tapering cross-section formed by an inclined annular surface 22. Centrifugal weights in the shape of wedge-shaped annular sections 23 are confined between the disc 20 and an annular reaction plate 24 and are radially inwardly biased by an elastic ring 25 surrounding the weights 23, as shown in FIG. 3. Reaction plate 24 is screwed within the open end of rotor portion 13 for adjusting its spacing from the radial wall of rotor portion 13.

Upon rotation of the input shaft section 4, the rotor portion 12 rotates and with the latter, the wedge-shaped annular weights 23. When the speed of rotation of the input shaft section 4 reaches a predetermined value, in this case approximately 1500 r.p.m., the centrifugal force acting on the sections 23 causes the latter to move radially outwardly, thereby wedging the friction disc 20 and the interfacing discs 17 and 19 into contact one with the other. There results a clutching which causes the intermediate shaft section 7 to rotate bodily with the input shaft section 4. It is seen that this clutch is responsive to the speed of the input shaft section 4.

A second centrifugal clutch assembly 26 is mounted onto the intermediate shaft section 7 in a manner and for a purpose which will now be explicitly defined in relation with FIG. 1. The centrifugal clutch assembly 26 includes a rotor portion 27 having an adjustably screwed reaction plate 28 which surrounds and is rotatable relative to shaft section 7. Similarly as the clutch assembly 12, the centrifugal clutch assembly 26 includes friction discs 17 and the interfacing discs 19 and 20 splined to shaft section 7 and to the rotor portion 27 respectively. Wedge- and sector-shaped centrifugal weights 29 are mounted between the reaction plate 28 and the inclined annular surface of the disc 20. There results that the proper rotation of the rotor portion 28 causes similar rotation of centrifugal weights 29 and their wedging action on disc 20. The wedging action of the weights 29 causes the axial displacement of the discs 17, 19, and 20 and interengagement of the latter. Preferably, weights 29 have a bore receiving a ball 30 pressed by a spring 31, in turn preferably abutting an adjustable screw (not shown). In the rest position of weights 29, their ball 30 engages an annular groove 28' in reaction plate 28 to temporarily retain the weights 29 against the increasing centrifugal force acting thereon and thus produce more rapid clutching of the discs 17, 19, and 20 upon release of weights 29, thereby reducing heating which would otherwise occur when the driver chooses to run the engine at a speed producing partial clutching. Elastic O-ring 33 urges weights 29 radially inwardly to a central position with balls 30 engaging the groove 28' of plate 28.

A planetary gear assembly 34 is mounted onto the intermediate shaft sections 7 and 9 and includes a sun gear 35 keyed to, or integral with, the shaft section 7 for rotation therewith, a planet carrier 36 formed by the bottom wall 37 of rotor portion 27, projections 38 and a flange 39 integral with sahft section 9, shafts 40 supported by the planet carrier 36, planets 41 rotatable on the shafts 40, and a ring gear 42 meshing with the planets 41. Rotor portion 27 is secured to planet carrier 36, in turn secured to shaft 9. Ring gear 42 includes a hub portion 43 which is freely rotatable around the intermediate shaft section 9 and axially restrained by a stop ring 44, held into a circular peripheral groove into the shaft section 9 and also by a thrust bearing 45 located between flange 39 and ring gear 42.

A one-way wedge clutch 46 is mounted around the hub portion 43 of the ring gear 42 and includes an inner rotary member formed by the hub portion 43, an outer rotary member 47 having cavities into the inner face thereof, and rollers 48 positioned into the cavities. All the cavities into the outer rotary member 47 taper into the same angular direction and the rollers 48 are urged towards the reduced portions of the cavities by springs 49. Outer rotary member 47 is preferably held against axial displacement by thrust bearings 50 and 51.

An output ring gear 52 is formed in the outer rotary member for rotation therewith. An output spur gear 53 is fixed to the intermediate shaft section 9 for rotation therewith. A gear unit 54 is slidably mounted onto the hub of spur gear 53 by a bushing 55 and is arranged to slide between the output ring gear 52 and the output shaft section 5. The latter includes axially directed recesses 56. The slidable gear unit 54 includes axial projections 57 engaging into the axial recesses 56 of the output shaft section 5 at all axial positions of the unit 54 relative to the output shaft section 5. The slidable gear unit includes external gear teeth 58 arranged to engage the teeth of the internally toothed ring gear 52. An internally toothed gear 59 is provided on the slidable gear unit 54 and arranged to selectively engage the spur gear 53. Output shaft 5 is preferably provided with the usual manually-operated disc brake including a disc 60 secure to the output shaft section 5 and a pair of jaws 61 pivoted at 62 adjacent the annular disc 60 and provided with friction facings 63 arranged to frictionally engage the opposite sides of the disc 60 upon closing of the jaws 61. A cam 64 is rotatably mounted between the outer ends of the jaws 61 and is fixed to a handbrake lever 65 for the actuation thereof. A spring 66 urges the jaws 61 against the opposite sides of the cam 64 and towards their open position.

A brake band 67 having a facing 68 of friction material is secured at one end to a pin 69 (see FIG. 10) extending parallel to the shaft sections and is curved around the rotor portion 27 of the second clutch assembly 26. The free end of the brake band 67 is bent into a hook portion 70. Similarly, a brake band 71 having a facing 72 of friction material is secured at one end to a pin 73 extending parallel to the shaft sections but on the other side thereof relative to the pin 69. The brake band 71 is curved around the outer rotary member 47 and has a free end which is bent into a hook portion 74, as best shown in FIG. 5.

A generally S-shaped slot 75 (see FIGS. 7, 8 and 9) is formed through the wall of a longitudinally extending semi-cylindrical boss 1' integral with the opening within casing 1 and includes a main portion extending lengthwise of the shaft sections and end portion extending transversely of the main portion on opposite sides and at the opposite ends of the latter. A shifting control rod 76 is supported inside the casing section 1 by inwardly projecting lugs or flanges 77. The shifting control rod 76 extends lengthwise of the shaft sections and is slidable lengthwise and rotatable into the lugs 77. The rod 76 includes a bent portion 78 extending outwardly through the slot 75 to form a shifting control lever.

A first and a second hook members 79 and 80 are rigidly secured to the shifting control rod 76 and angularly and axially spaced relative to each other to engage the hook portions 70 and 74 respectively of the brake bands 67 and 71. A fork member 81 is secured to the shifting rod 76 by a screw 82 engaging into an annular groove formed into the rod. There results a lengthwise displacement of the fork member 81 with the rod and a free rotation of the latter relative to the fork member. The latter is provided with a pair of spaced-apart and aligned studs 83 arranged to diametrically engage the sliding gear unit 54 into an exterior circular groove 84 thereof, as best shown in FIG. 1.

The shifting lever 76 may take three distinct positions: a central position into the slot 75, as shown in FIG. 7, and two extreme positions at the opposite ends of the slot 75.

The central position of the shifting lever 76 results in none of the two hook members 79 and 80 applying the corresponding brake and in the holding of the sliding gear unit 54 into a neutral position engaging neither of the two output gears 52 and 53, as shown in FIGS. 1 and 10. In such case, neither of the two brakes are applied and the rotor portion 27 and the outer rotary portion 47 are free to rotate. The intermediate shaft section 9 can then rotate inside the gear unit 54 but neither of the two output gears is connected to drive the output shaft section 5.

Referring to FIG. 7, when the shifting lever 78 is displaced to the right and pivoted to the upper end of the slot 75, forward drive is obtained, as will now be explained. As illustrated in FIG. 11, the above-mentioned right-hand side position of the lever 78 causes displacement of the sliding gear unit 54 until engagement with the first output gear 53 and causes the hook member 80 to pull the free end of the brake band 71, thereby applying the brake to the outer rotary member 47 to completely stop rotation of the latter. During that time, the hook member 79 causes the brake band 67 to completely disengage the rotor portion 27. In such condition, assuming the input shaft section 4 normally rotates counterclockwise, as seen from the left in FIG. 1 and at least at the clutching speed of the centrifugal clutch assembly 12, the intermediate shaft section 7 then rotates at the same speed and in the same direction as the input shaft section 4. The second centrifugal clutch assembly 26 is constructed to engage at a higher speed than the clutch assembly 12, say 3000 r.p.m., as compared to 1500 r.p.m. For all the speeds of rotation intermediate those two speeds of engagement, the rotor portion 27 and, consequently, the planet carrier 36 are not solicited to rotate by the friction discs 17 of clutch 26, which are not then engaged. The sun gear 35 is positively driven with the shaft section 7. The planets 41 are then induced to rotate about the stud shafts 40 thereof, causing a reaction tending to rotate the ring gear 42 in reverse relative to the sun gear 35, that is clockwise while still looking from the left in FIG. 1. The clockwise reaction on the ring gear 42 is not converted into rotation of the latter, since the outer rotary member 47 is immobilized by the brake band 71 and the rollers 48 of the one-way wedge clutch assembly wedgingly engage the hub portion 43 of the ring gear 42. There results a rotation of the planet carrier 36 in forward direction at lower speeds than the input shaft section 4. The intermediate shaft section 9 is thus rotated at those lower speeds and so is the first output gear 53; the latter being then engaged with the internal gear 59 of the sliding gear 54 and the latter being always engaged with the output shaft section 5 by the axial projections 57, there results the same low speeds and forward drive of the output shaft section 5.

When the output shaft section 5 reaches and exceeds the speed of engagement of the second centrifugal clutch assembly 26, in this case say at about 3000 r.p.m., the rotor portion 27 and the planet carrier 36 are then bodily rotated counterclockwise with the shaft section 7 and the sun gear 35. Due to the action of the one-way wedge clutch assembly 46, the ring gear is free to rotate bodily with the rest of the planetary gear assembly and a forward speed of 1 to 1 ratio is then transmitted to the output gear 53 and the output shaft section 5. It is seen that the second clutch assembly 26 is responsive to the speed of rotation of the output shaft section 5 and serves to lock the planet carrier 36 onto shaft section 7, whereby there is no relative rotation of the gears in the planetary gear train.

Referring still to FIG. 7, when the shifting lever 78 is displaced and pivoted to the left and bottom end of the slot 75, the gear unit 54 is moved into engagement with the second output gear 52, the hook member 79 applies the brake band 67 against the rotor portion 27 and the hook member 80 disengages the brake band 71 from engagement with the outer rotary member 47. This corresponds to the reverse drive position.

As compared to the forward drive, the rotor portion 27 and the planet carrier 36 are then immobilized and the rotation of the sun gear 35 is then converted into a reverse or clockwise drive of the ring gear 42 by the planets 41, which rotates about their spatially fixed shafts 40. The one-way clutch 46 by the wedging engagement of the rollers 48 then transmits the rotation of the hub portion 43 to the outer rotary member 47 and the second output gear 52 to the sliding gear unit 54. The latter, being still engaged with the output shaft section 5 by the axial projections 57, rotates in reverse and transmits that rotation to the output shaft section 5.

The first clutch assembly 12 is preferably of the dry type, as shown, it being located outside casing 1 which is partially filled with lubricating oil. However, it could be exposed to oil as is the case for the second clutch assembly 26 and located within casing 1.

Centrifugal weights 23 of the first clutch assembly 12 can be replaced by weight levers pivotally mounted on rotor portion 13 and having free inner ends exerting an axial force on disc 20 which would then be flat at its outer face. Excessive heat generated by friction between the clutch discs occurs in the second clutch assembly 26 when the vehicle does not acclerate fast enough in the clutching range of said clutch assembly 26 whereby the clutching discs slip relative to one another for too long a time. This is prevented by the provision of the temporary retaining means to retain the weights 29 in inactive position with the discs 17, 19, and 20 disengaged until the progressively increasing centrifugal force exerted thereon is sufficient to produce rapid clutching of discs 17, 19, and 20 upon weight release by said retaining means. Said last-named means consist in the example shown of spring-pressed balls 30 carried by weights 29 and releasably engaging annular groove 28' of plate 28. Upon decelerating elastic band 25' returns weights 29.

I claim:

1. An automatic transmission comprising an input shaft, an output shaft coaxial with said input shaft, a planetary gear assembly including a sun gear fast on said input shaft, a planet carrier, a ring gear, planets carried by said planet carrier and meshing with said sun gear and ring gear, a centrifugal clutch assembly having driving clutch elements connected to said input shaft for rotation therewith and driven elements connected to said planet carrier for rotation therewith and responsive to a predetermined speed of rotation of one of said input shaft and of said planet carrier to clutch said driven to said driving elements, a one-way clutch having a driving element secured to said ring gear and a driven element, a selector rotatably connected to said output shaft and operable to selectively couple with said one-way clutch driven element or with said planet carrier, first and second brake means to selectively stop rotation of said one-way clutch driven element and said planet carrier, and manually-operated means alternatively producing braking action of said first brake means when said selector couples with said planet carrier and of said second braking means when said selector couples with said one-way clutch driven element, said one-way clutch clutching its driven element to its driving element when said driving element tends to rotate in a direction opposite to that of said input shaft so that, when said planet carrier is stopped from rotating by said second brake means and said selector couples said one-way clutch driven element with said output shaft, said sun gear drives said ring gear in reverse through said planets and said one-way clutch clutches said ring gear with said selector, and when said one-way clutch driven element is stopped from rotating by said first brake means and said selector couples said planet carrier with said output shaft and when said centrifugal clutch is declutched, said sun gear drives said planet carrier at lower speed than said sun gear with said ring gear acting as reaction element for said planets, said ring gear being stopped from rotating by said one-way clutch and upon clutching of said planet carrier to said sun gear by said centrifugal clutch, said sun gear drives said planet carrier and ring gear as a unit at the same speed as that of said sun gear, said one-way clutch then allowing rotation of said ring gear.

2. An automatic transmission as claimed in claim 1, further including an additional centrifugal clutch assembly carried by the input end of said input shaft and having driven clutch elements connected to said input shaft for rotation therewith and driving clutch elements adapted to be connected to a driving shaft of a power source for rotation thereby, said additional clutch assembly responsive to a predetermined speed of rotation of said driving shaft to clutch said input shaft to said driving shaft, the speed of rotation at which clutching of said additional clutch assembly takes place being lower than the speed or rotation at which clutching of said first-named clutch assembly takes place.

3. An automatic transmission as claimed in claim 1, further including an intermediate shaft coaxial with said input and output shafts and to which said planet carrier is secured, a first gear fast on said intermediate shaft, a second gear fast on said one-way clutch driven element, said first and second gears being axially spaced, said selector mounted for axial shifting and rotation on said intermediate shaft between said first and second gears and axially shiftable relative to said output shaft, said selector having gear means meshing with said first and second gears, said manually-operated means including means to shift said selector simultaneously with the operation of said first and second brake means.

4. An automatic transmission as claimed in claim 3, wherein said manually-operated means include an axially shiftable and rotatable control rod, extending along an axis parallel to said shafts, a fork member rotatably carried by said control rod, means to prevent movement of said fork member axially of said control rod, said fork member rotatably engaging said selector to axially shift the latter and said first and second brake means including arms fixed to said control rod at opposite sides thereof, whereby rotation of said control rod in one direction will actuate one brake means and release the other, and vice versa, when the control rod is rotated in the opposite direction.

5. An automatic transmission as claimed in claim 1, wherein said first-named centrifugal clutch assembly is responsive to a predetermined speed of rotation of said planet carrier.

6. An automatic transmission as claimed in claim 5, wherein said first-named centrifugal clutch assembly includes a cylindrical rotor portion secured to said planet carrier and coaxial with said shaft and having interior splines, said input shaft extending within said rotor portion and having external splines, said driving and driven clutch elements including interengageable friction discs stacked within said rotor portion and alternately splined to said rotor portion and to said input shaft, an axially displaceable pusher plate splined to said rotor portion and having one face engageable with an adjacent friction disc, and its other face formed as frusto-conical surface radially outwardly inclined in a direction away from said friction discs, a reaction plate carried by said rotor portion and spaced from said frusto-conical surface, and centrifugal weights located between and engaging said frusto-conical surface and reaction plate, and radially displaceable under centrifugal force to wedge said pusher plate towards said friction discs and cause clutching of said friction discs.

7. An automatic transmission as claimed in claim 6, wherein said centrifugal weights have a segmental shape with a frusto-conical surface to conform to the frusto-conical surface of said pusher plate.

8. An automatic transmission as claimed in claim 7, wherein the face of said reaction plate engaging said centrifugal weights is substantially flat and radial and said centrifugal weights carry spring-pressed balls contacting said reaction plate face, the latter having an annular groove receiving the balls of said centrifugal weights in a radially inward limit position of sad weights in which they release said friction discs.

9. An automatic transmission as claimed in claim 1, wherein said centrifugal clutch includes centrifugal weights movable radially outwardly under centrifugal force from a radially inward limit position in which they release the clutch assembly, and further including elastic retaining means retaining said centrifugal weights in said limit position against radial movement and releasing said weights when the centrifugal force exerted thereon is sufficient to cause said weights to clutch the clutch assembly.

* * * * *